Dec. 2, 1952          F. L. WHITE          2,620,173
MACHINE FOR MAKING HOT TAMALES AND SIMILAR FOOD PRODUCTS
Filed Dec. 15, 1948          2 SHEETS—SHEET 1
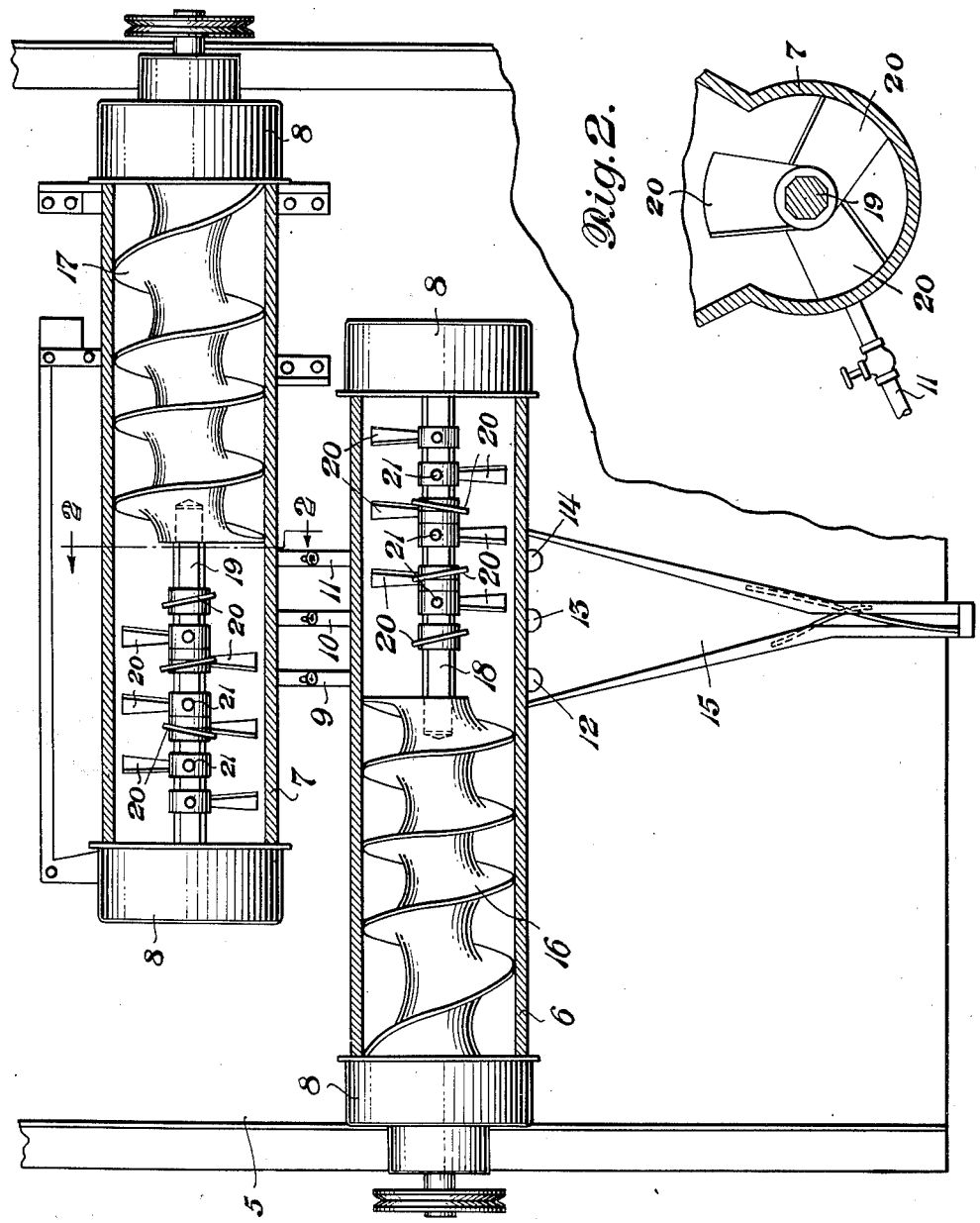
Inventor
Felix L. White
By
Munson H. Lane
ATTORNEY Dec. 2, 1952 F. L. WHITE 2,620,173
MACHINE FOR MAKING HOT TAMALES AND SIMILAR FOOD PRODUCTS
Filed Dec. 15, 1948 2 SHEETS—SHEET 2
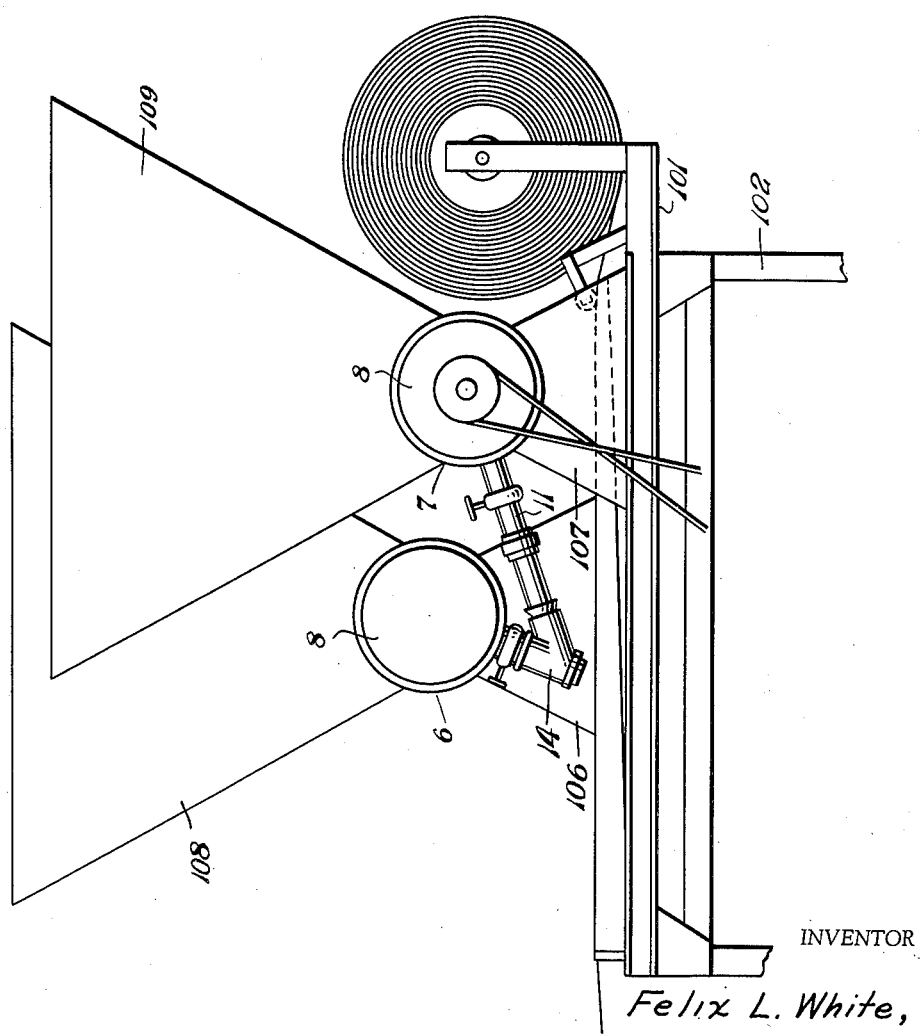
INVENTOR
Felix L. White,
BY Munson H. Lane
ATTORNEY Patented Dec. 2, 1952

2,620,173

UNITED STATES PATENT OFFICE 2,620,173

MACHINE FOR MAKING HOT TAMALES AND SIMILAR FOOD PRODUCTS

Felix L. White, Dallas, Tex.; Ben White, executor of said Felix L. White, deceased, assignor of one-half to Minnie A. White, Dallas, Tex., one-fourth to Evalina E. Michael, Dallas, Tex., and one-fourth to Eulalie M. Hermann, Houston, Tex.

Application December 15, 1948, Serial No. 65,331

11 Claims. (Cl. 259—9)

1

This invention relates to machines for making tamales and similar food products and is an improvement on the machine disclosed in my Patent No. 2,142,468, dated January 3, 1939.

In the machine of said patent two hoppers are provided, one at each side of the machine, one for holding a supply of flavored meal mixture, the other to contain the ground meat. The hoppers discharge into the outer ends of a pair of conveyor housings or cylinders closed at each end by suitable caps, the cylinders being arranged in parallel relation to each other transversely of the machine and so spaced that the inner ends thereof overlap. A pressure feed screw or screw conveyor is arranged to rotate within each conveyor housing or cylinder so as to feed the product entering the cylinder from its respective hopper to and through one or more discharge outlets leading from the cylinder. There are preferably three discharge pipes leading from each conveyor housing, with each meat discharge pipe arranged coaxially within the larger meal discharge pipe, so that the meal as it is extruded forms a shell or outer layer enclosing a core of meat. Subsequent operations include wrapping the tamale extrusion or "stream" in paper, cutting to length, and packing the tamales in cans, all readily understood by referring to the patent.

Generally speaking, the patented machine works well, saving a vast amount of labor and turning out a satisfactory product. In one particular, however, the machine has been unsatisfactory: the feeding of the products from the hoppers to the discharge pipes has seldom been perfect, usually one discharge pipe discharging much more than the other two; sometimes all the product moving out of a hopper will flow through one pipe only. The flow is greatly influenced by the physical characteristics of the products in the hoppers. (Necessarily market and other conditions require that these products be changed from time to time.)

By the present improvements I aim to provide simple mechanism to insure extrusion at the same rate of feed from each pipe, also to insure equal or uniform feeding even when the products are changed. Another object is to make replacement of certain parts of the feed screw a simple operation. A further object is to effect these improvements without substantial change in the machine as a whole. Other objects will be apparent from the following description of the preferred embodiment of the invention which is shown in the accompanying drawing forming a part of this specification.

In said drawing:

Fig. 1 is a fragmentary horizontal section through the machine, showing particularly the lower ends of the hoppers with the improved feed screws therein;

Fig. 2 is a vertical cross section on the line 2—2 of Fig. 1 and including also a fragmentary portion of the inclined walls of one of the feed hoppers.

Fig. 3 is an end view showing the relative arrangement of the feed hoppers with reference to the conveyor housings, and indicating the relation of the discharge outlets from the respective housings.

Referring particularly to the drawing, the top of the table of the patented machine is indicated at 5, and cylinders 6, 7 arranged transversely of the machine respectively directly below the meal hopper 108 and meat product hopper 109. Cylinders 6, 7 are closed at both ends by caps 8 in which bearings (not shown) are provided for the shafts of the power driven feed screws to be described. Three discharge pipes 9, 10, 11 receive the meat product from cylinder 7 and extend into and through the meal product discharge pipes 12, 13, 14 respectively to deliver a "stream" or extrusion of meat within an enveloping extrusion of meal product, as disclosed in said patent. As shown, the table upon which the mechanism is supported includes longitudinally extending frame members 101 and legs 102, and carries thereon supports 106 and 107 for the conveyor cylinders 6 and 7 and for the hoppers 108 and 109 carried thereby. The paper-folding trough-like member 15 is also indicated, and the paper feeding means, but the conveyor and other cooperating parts are omitted because they form no part of the present invention and are not essential to an understanding thereof, but are fully disclosed in my aforesaid Patent No. 2,142,468.

In the machine of the patent, both cylinders contain feed screws in the form of spiral conveyors which feed toward the overlapping ends of the cylinders. The product so fed is supposed to flow uniformly out of the three discharge pipes, but actually what happens is that the product is heavily pressed into the discharge end of either cylinder and forms a very compact mass which does not flow at all. Usually most or all the discharge takes place from the pipe which is farthest from the end of either cylinder (pipes 11 and 12). Thus the production of the machine may be cut as much as two-thirds, and in addition, the compacted material in the cylinder ends must be dug out, with some difficulty, at the end of each run of the machine.

To obviate these undesirable results, I have provided in the cylinders power-driven spiral conveyors or feed screws 16, 17 which extend for only approximately half the length of cylinders 6, 7, respectively, the discharge ends of the feed screws terminating just short of the nearest discharge pipe 11 or 12. Shafts 18, 19 are each secured at one end by screw threads 18a, 19a to the ends of the feed screws 16, 17 respectively, being aligned with the axes of said feed screws. Said shafts are preferably hexagonal, to facilitate attachment and removal of propeller blades 20, but may have other non-circular cross sections, and have their opposite ends journaled in appropriate bearings (not shown) in caps 8. Slidably and non-rotatably mounted on each shaft 18, 19 are a plurality of angled propeller blades 20 each extending radially outwardly as shown, and each being secured against sliding by a set screw or the like 21. There may be nine or more of the blades, each secured at an angle relative to the blades on either side, and each spaced along its shaft so as to give the best results with the product being fed from the hopper. All the blades have their ends in contact with the cylinder walls, and all lie in planes which intersect the axis of the shaft at acute angles. The last three blades, or the three nearest the journaled end of the blade shaft, are preferably set at an opposite angle to that of the first six blades, the purpose being to force the product back from the end where it would normally be compacted by the feed screw. It has been found that the described arrangement of the blades breaks up any compacted or compressed mass of the product and equalizes the pressure on that portion of the product which is adjacent the inlets of the discharge pipes, so that the product flows uniformly through all three pipes. The action is the same with both the meal product and the meat product. If the characteristics of either product are changed, it is only necessary to vary the spacing of the blades along their shafts to again insure uniform discharge. If one of the blades should become worn or break, it is easily replaced by merely slipping it off its shaft after loosening the set screw.

It will be clear that the hexagonal shafts with their blades provide combination product-agitating and conveying means, with some of the blades working in a direction opposite to that of the feed screw while other blades work in the same direction, thus subjecting the product to opposing pressures from opposite sides of the outlets to the discharge pipes 9, 10, 11 or 12, 13, 14.

It will be further understood that while the spiral conveyors or feed screws 16 and 17 tend to compact or condense the material being fed toward the laterally disposed outlet means, the spaced radial blades 20 tend to agitate and thus loosen the material being treated, and where a non-homogeneous product is being treated, as, for example, incompletely mixed dough meal or incompletely mixed meats, a mixing function is also performed by the agitating blades in addition to their conveying function.

Obviously changes in the described embodiment of the invention may be resorted to without departing from the scope of the invention, which is defined in the appended claims.

What I claim is:

1. A feeding mechanism for finely divided food products and the like which have a tendency to pack or form hard masses when subjected to pressure, comprising a casing closed at its ends and having an inlet opening adjacent one end and at least one lateral discharge outlet intermediate its ends, a screw conveyor in the casing extending from one end of the casing toward said outlet and acting to force the product longitudinally of the casing toward said discharge outlet, and supplemental product conveying means comprising a series of spaced radial propeller blades mounted on a shaft coaxial with the screw conveyor and acting when rotated to force the product to move longitudinally from the opposite end of the casing toward said discharge outlet and serving also to agitate the product being conveyed.

2. A feeding mechanism for finely divided food products and the like which have a tendency to pack or form hard masses when subjected to pressure, said feeding mechanism comprising a casing closed at its ends and an inlet opening adjacent one end and having plural lateral discharge outlets intermediate its ends, a screw conveyor extending from one end of the casing and terminating short of the discharge outlets for forcing the product longitudinally of the casing in one direction toward said outlets, and supplemental product conveying means comprising a series of spaced radial rotatable product agitating and conveying blades located beyond said screw conveyor and serving when rotated to agitate the product and move the same longitudinally of the casing in the opposite direction toward the outlet openings.

3. A feeding mechanism comprising a casing closed at its ends and having a lateral discharge outlet pipe intermediate its ends, said casing having an inlet opening adjacent one end, and diverse material conveying means arranged in the casing on opposite sides of the discharge outlet pipe, each conveying means acting to move the material toward the discharge outlet, one of said conveying means comprising a screw conveyor serving to move the product toward said outlet pipe and the other comprising a series of spaced radial propeller blades acting also to agitate or stir the material being conveyed.

4. A combined feeding and agitating mechanism comprising a casing closed at its ends and having plural lateral discharge outlets intermediate its ends, said casing having an inlet opening adjacent one end, and product conveying means arranged in the casing on opposite sides of the discharge outlets, each product conveying means acting to move the product toward the discharge outlets, one of said conveying means comprising a screw conveyor extending from one end of the casing toward said outlets and the other comprising a series of spaced radial propeller blades mounted on a shaft coaxial with said screw conveyor and extending to the opposite end of the casing, said spaced radial blades acting also to agitate or stir the product being conveyed.

5. In combination, a fixed screw conveyor casing closed at its ends and having an inlet opening adjacent one end and lateral discharge outlets intermediate its ends and being entirely free of any product-flow-obstructing elements, means for feeding a fluent product away from the inlet end of said casing toward said outlets, comprising a feed screw rotatably mounted in the casing and extending only from the inlet end of the casing to the nearest of the discharge outlets, means for preventing clogging of the product at the end of said casing opposite said feed screw comprising a shaft having a plurality of radial propeller blades fixed thereto and extending outwardly into end contact with the casing, said shaft extending from that end of the feed screw which is adjacent a discharge outlet to the remote end of the casing, the blades being located between said outlets and the remote end of the casing and being mounted with their faces inclined relative to the axis of the shaft so that when they are rotated by the shaft they will stir the product and move it back from the remote end of the casing, and means to rotate the feed screw, shaft and radial blades.

6. In combination, a fixed screw conveyor casing closed at its ends and having a top inlet opening adjacent one end and lateral discharge outlets intermediate its ends, means for feeding a fluent product away from the inlet end of said casing toward said outlets, comprising a feed screw rotatably mounted in the casing and extending only from the inlet end of the casing to the nearest of the discharge outlets, and supplemental product conveying means comprising a shaft rotatably mounted in the casing and coaxial with the feed screw, said shaft having a plurality of radially extending propeller blades fixed thereto, some of the blades being located intermediate the feed screw and at least one discharge opening and having their faces inclined at such angles to the shaft axis that they will force fluent material in the casing in one direction toward the discharge outlet and the remote end of the casing while others of the blades are positioned intermediate the openings and the end of the casing remote from the feed screw and have their faces oppositely inclined so that they will force fluent material at and near said remote end away from the same and toward the discharge outlets in the opposite direction from the first set of blades, whenever the blades are rotated by the shaft, and means to drive the feed screw and shaft.

7. In combination, a fixed screw conveyor casing closed at its ends and having a top inlet opening adjacent one end and lateral discharge outlets intermediate its ends, means for feeding a fluent product away from the inlet end of said casing toward said outlets, comprising a feed screw rotatably mounted in the casing and extending only from the inlet end of the casing to the nearest of the discharge outlets, and supplemental product conveying means comprising a shaft fixed to and removable from that end of the feed screw which is adjacent a discharge outlet and having its axis coincident with the axis of the feed screw, a plurality of radial propeller blades carried by the shaft, cooperating means on the shaft and blades to hold the blades against rotation relative to the shaft while permitting the blades to be individually slid along the shaft to facilitate adjustment of the relative positions of the blades and to permit removal of the blades, and means to secure each blade in its adjusted position, some of the blades being on opposite sides of at least one of the discharge outlets from one another and having their transverse faces inclined at different angles on said opposite sides, whereby the fluent material in the casing is moved in opposite directions by said blades toward said discharge outlet.

8. In combination a fixed screw conveyor casing closed at its ends and having an inlet opening adjacent one end and lateral discharge outlets intermediate its ends, means for feeding a fluent product away from the inlet end of said casing toward said outlets, comprising a feed screw rotatably mounted in the casing and extending only from the inlet end of the casing to the nearest of the discharge outlets, and supplemental product conveying means comprising a shaft rotatably mounted in the casing and extending only from the opposite end of the casing to the feed screw, a plurality of radial propeller blades fixed to said shaft, means permitting adjustment of the blades longitudinally of the shaft and also removal of the blades, the outer ends of the blades being substantially in contact with the inner walls of the casing, said blades being perpendicular to the shaft and arranged with their transverse faces at inclined angles on the shaft, certain of said blades being located between the feed screw and at least one of said discharge outlets and others being located between the discharge outlets and the end of the casing remote from the feed screw, the blades which are between the discharge outlets and the remote end of the casing being inclined oppositely relative to the other blades, the parts being so constructed and arranged that the feed screw delivers the material to the blades and the blades thoroughly agitate or mix the material prior to forcing it away from the remote end of the casing and out through the discharge outlets at substantially the same rate of flow through each outlet.

9. The invention as defined in claim 8, wherein the shaft is non-circular in cross section and each blade may be slid along the shaft to vary its position in the casing, one end of the shaft being screwed into the end of the feed screw so that that shaft will turn with the feed screw, yet may be readily removed therefrom.

10. In combination, a fixed screw conveyor casing closed at its ends and having a top inlet opening adjacent one end and lateral discharge openings intermediate its ends, and a product conveying assembly housed within said casing, comprising a feed screw; a shaft removably fixed to one end of the feed screw and coaxial therewith; a plurality of propeller blades fixed upon the shaft and extending radially outwardly therefrom; some of said blades, located near the end of the feed screw to which the shaft is fixed, having their transverse faces inclined at such angles relative to the axis of the shaft as to continue the flow of any fluent material acted upon by the feed screw; others of said blades, located at and near the end of the shaft which is remote from the fixed end, having their faces oppositely inclined so as to cause said material to flow in the reverse direction; all of said blades acting to agitate and stir the material as well as convey it.

11. The invention as defined in claim 10, wherein the shaft is non-circular and the blades have hub ends which are slidable on the non-circular shaft so as to be adjustable thereon and removable therefrom; set screws securing the blades in their adjusted positions.

FELIX L. WHITE.

REFERENCES CITED

The following references are of record in the file of this patent:

UNITED STATES PATENTS

| Number | Name | Date |
|---|---|---|
| 858,354 | Sharpneck | June 25, 1907 |
| 1,690,904 | Laemmel | Nov. 6, 1928 |
| 1,732,281 | Robinson | Oct. 22, 1929 |
| 2,125,729 | Kretchmer | Aug. 2, 1938 |
| 2,437,460 | De Fransisci | Mar. 9, 1948 |

FOREIGN PATENTS

| Number | Country | Date |
|---|---|---|
| 624,839 | Germany | Jan. 29, 1936 |